(12) United States Patent
Sasaki (10) Patent No.: US 11,165,715 B2
(45) Date of Patent: Nov. 2, 2021

(54) COMMUNICATION CONTROL METHOD (71) Applicant: MAXELL, LTD., Kyoto (JP)

(72) Inventor: Akira Sasaki, Tokyo (JP)

(73) Assignee: MAXELL, LTD., Kyoto (JP)

( * ) Notice: Subject to any disclaimer, the term of this patent is extended or adjusted under 35 U.S.C. 154(b) by 247 days.

(21) Appl. No.: 16/309,052

(22) PCT Filed: Jun. 14, 2016

(86) PCT No.: PCT/JP2016/067695
§ 371 (c)(1),
(2) Date: Dec. 11, 2018

(87) PCT Pub. No.: WO2017/216880
PCT Pub. Date: Dec. 21, 2017

(65) Prior Publication Data
US 2020/0314023 A1 Oct. 1, 2020

(51) Int. Cl.
*H04L 12/28* (2006.01)
*H04L 12/927* (2013.01)
(Continued)

(52) U.S. Cl.
CPC .......... *H04L 47/805* (2013.01); *H04L 41/083* (2013.01); *H04L 41/0896* (2013.01); *H04L 47/2475* (2013.01)

(58) Field of Classification Search
CPC ........ H04B 1/40; H04L 12/24; H04L 12/859; H04L 12/927; H04L 41/083;
(Continued)

(56) References Cited

U.S. PATENT DOCUMENTS 7,028,077 B2 * 4/2006 Toshimitsu ............. H04L 29/06 709/214
8,429,745 B1 * 4/2013 Casaburi ............. G06F 21/6254 726/22
(Continued)

FOREIGN PATENT DOCUMENTS

JP 2013-126166 A 6/2013

OTHER PUBLICATIONS

International Search Report issued in corresponding International Patent Application No. PCT/JP2016/067695, dated Aug. 23, 2016, with English Translation.
(Continued)

*Primary Examiner* — Frank Duong
(74) *Attorney, Agent, or Firm* — McDermott Will & Emery LLP (57) ABSTRACT

In a smartphone or a personal computer, when there is an application which performs communication which a user is unconscious of, a communication volume increases unintentionally, and there arise problems in that a maximum communication volume is exceed, a network bandwidth of a base station is compressed, or communication being intentionally performed is disturbed. In order to solve the above problems, provided is a communication control method used in a communication control device capable of performing communication using an application via a communication line, and includes an application control step of switching a plurality of applications between a foreground state and a background state and a communication control step of changing an allocation amount of a network bandwidth of an application in accordance with whether the switched application is in the foreground state or the background state.

7 Claims, 5 Drawing Sheets

(51) Int. Cl.
*H04L 12/24* (2006.01)
*H04L 12/859* (2013.01)

(58) Field of Classification Search
CPC ............. H04L 41/0896; H04L 43/0805; H04L 43/0882; H04L 43/0888; H04L 47/2475; H04L 47/76; H04L 47/803; H04L 47/805; H04L 67/14; H04W 4/50; H04W 28/20; H04W 88/02
See application file for complete search history.

(56) References Cited

U.S. PATENT DOCUMENTS

| | | |
|---|---|---|
| 9,258,672 B2 * | 2/2016 | Aida ..................... H04L 67/10 |
| 2011/0185052 A1 | 7/2011 | Nakahira |
| 2013/0191541 A1 | 7/2013 | Kishan et al. |
| 2015/0100620 A1 | 4/2015 | Jin |
| 2015/0130761 A1 | 5/2015 | Hong et al. |
| 2016/0286544 A1 * | 9/2016 | Ikeda ................... H04W 28/18 |
| 2017/0215022 A1 * | 7/2017 | Chang ................... H04L 67/14 |

OTHER PUBLICATIONS

Office Action issued in corresponding Japanese Patent Application No. 2018-523082, dated Aug. 6, 2019, with English translation.

* cited by examiner

| # | LINE TYPE | LINE DETAILS | BACKGROUND NETWORK BANDWIDTH RESTRICTION | RESTRICTION VALUE |
|---|---|---|---|---|
| 1 | LTE/3G | CELL #1 | RESTRICTED | 128kbps |
| 2 | WLAN | 222222 | NOT RESTRICTED | NONE |
| 3 | WLAN | 333333 | RESTRICTED | 10% OF NETWORK BANDWIDTH |

| CELL #1 | SUNDAY | MONDAY | TUESDAY | WEDNESDAY | THURSDAY | FRIDAY | SATURDAY |
|---|---|---|---|---|---|---|---|
| 0:00-8:00 | 256kbps | 1Mbps | 1Mbps | 1Mbps | 1Mbps | 1Mbps | 256kbps |
| 8:00-16:00 | 128kbps | 256kbps | 256kbps | 256kbps | 256kbps | 256kbps | 128kbps |
| 16:00-24:00 | 128kbps | 128kbps | 128kbps | 128kbps | 128kbps | 128kbps | 128kbps |
| CELL #2 | SUNDAY | MONDAY | TUESDAY | WEDNESDAY | THURSDAY | FRIDAY | SATURDAY |
| 0:00-8:00 | 1Mbps | 1Mbps | 1Mbps | 1Mbps | 1Mbps | 1Mbps | 1Mbps |
| 8:00-16:00 | 1Mbps | 1Mbps | 1Mbps | 1Mbps | 1Mbps | 1Mbps | 1Mbps |
| 16:00-24:00 | 128kbps | 128kbps | 128kbps | 128kbps | 128kbps | 128kbps | 128kbps |

| # | BANDWIDTH THRESHOLD VALUE | BACKGROUND NETWORK BANDWIDTH RESTRICTION | BACKGROUND PRIORITY |
|---|---|---|---|
| 1 | 1Gbps | NOT RESTRICTED | — |
| 2 | 100Mbps | RESTRICTED RESTRICTED | 9 |
| 3 | 1Mbps | | 1 |

304

F I G. 8

| # | APPLICATION NAME | PRESENCE OR ABSENCE OF RESTRICTION ON NETWORK BANDWIDTH | RESTRICTION VALUE |
|---|---|---|---|
| 1 | BROWSER | RESTRICTED | USE RESTRICTION VALUE OF LINE |
| 2 | IMAGE BROWSING | NOT RESTRICTED | NONE |
| 3 | DOCUMENT GENERATION | RESTRICTED | 1Mbps |

COMMUNICATION CONTROL METHOD

CROSS REFERENCE

This application is the U.S. National Phase under 35 U.S.C. § 371 of International Application No. PCT/JP2016/067695, filed on Jun. 14, 2016, the entire contents of each are hereby incorporated by reference.

TECHNICAL FIELD

The present invention relates to a communication control method used in a communication control device capable of performing communication using an application via a communication line.

BACKGROUND ART

In mobile communication lines used by smartphones, mobile routers, and the like, a maximum communication volume which can be used in a month is often decided by a contract, and when the maximum communication volume is exceeded, a subsequent network bandwidth is restricted, and a communication rate remarkably decreases.

A background technology of the present technical field is disclosed in JP 2013-126166 A (Patent Document 1). Patent Document 1 discloses a method in which, for example, in a case in which a maximum communication volume is exceeded, and a network bandwidth is restricted, when there is another line whose network bandwidth is not restricted, switching to the line is automatically performed.

CITATION LIST

Patent Document

Patent Document 1: JP 2013-126166 A

SUMMARY OF THE INVENTION

Problems to be Solved by the Invention

In the technique disclosed in Patent Document 1, communication is performed while switching a communication path, and thus appropriate communication can be performed even when a path on which a bandwidth restriction is imposed is used, but reduction in a communication volume is not taken into consideration.

In order to prevent the maximum communication volume from being exceeded, it is necessary for a user to suppress the communication volume consciously, but, depending on an application of a smartphone or a personal computer (PC), communication which the user is unconscious of may be performed. For example, there are cases in which background communication not displayed on a display screen such as backing up data such as photographs to a server regularly or downloading news information or the like is performed. Since communication is performed in accordance with a fixed time or condition, manipulation of the user is unnecessary, and a communication status is not displayed greatly in a front surface of a display screen, it is hard for the user to notice that communication is being performed. For this reason, even though the user attempts to suppress the communication volume consciously, it does not become a target, and accordingly, the communication volume increases unintentionally.

As a solution of a related art, there is a technique capable of setting whether or not a backup process or the like is executed for each communication line to be used as a setting of an operating system (OS) of a smartphone or a personal computer. However, execution of a predetermined process is unable to be controlled with this setting. For example, the backup process is just a part of communication which the user is unconscious of.

There are other problems caused by such communication which the user is unconscious of. For example, in a mobile line, when a plurality of communication terminals are connected to a base station at the same time and perform communication, a network bandwidth of a base station is compressed, and a communication rate decreases in each communication terminal in a connected state. Under such circumstances, if communication which the user is unconscious of is performed, the network bandwidth of the base station is compressed unnecessarily, and the communication rate decreases, so that the convenience of the user of the base station deteriorates.

Further, as another problem, if unconscious communication is performed at the same time as communication being intentionally performed by the user, the network bandwidth of the communication being intentionally performed is compressed, the communication rate decreases, so that the convenience deteriorates.

As described above, when communication which the user is unconscious of is performed, there arises problems in which the maximum communication volume is exceeded, the network bandwidth of the base station is compressed, or communication being intentionally performed is disturbed.

Solutions to Problems

In order to solve the above problems, according to the present invention, as an example, provided is a communication control method used in a communication control device capable of performing communication using an application via a communication line, and includes an application control step of switching a plurality of applications between a foreground state and a background state and a communication control step of changing an allocation amount of a network bandwidth of an application in accordance with whether the switched application is in the foreground state or the background state.

Effects of the Invention

According to the present invention, there are effects in that it is possible to reduce a communication volume which the user is unconscious of, and little restriction is imposed on a communication rate.

MODE FOR CARRYING OUT THE INVENTION

First, an overview of an example of the present invention will be described. In a communication terminal such as a smartphone or a PC, in order to suppress unconscious communication, communication which the user is unconscious of is regarded as communication performed by an application in a background state, and an allocation amount of a network bandwidth is changed in accordance with whether an application is in a foreground state or a background state. More specifically, a network bandwidth of an application in the background state is restricted. It is determined whether or not it is necessary to impose a restriction depending on a line being connected, a date and time, a target application, a current network bandwidth, or the like. In a case in which an application in an active state performs switching between the foreground state and the background state, a restriction on a network bandwidth of an application which newly enters the foreground state is canceled, and a restriction is imposed on a network bandwidth of an application which newly enters the background state.

First Example

Figure 1:
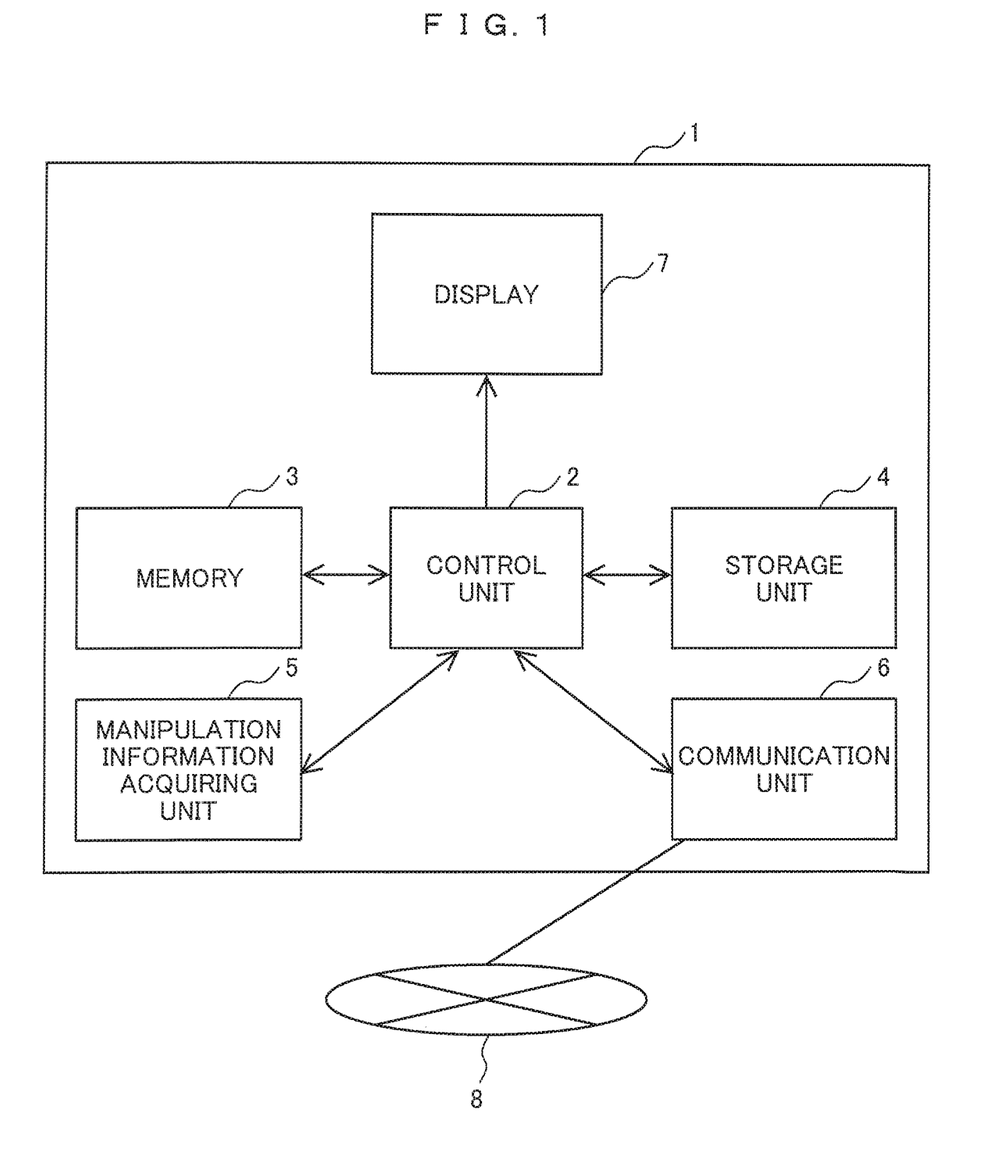
FIG. 1 is a block configuration diagram illustrating one embodiment of a communication control device in a first example.

FIG. 1 is a diagram illustrating a hardware configuration example of a communication control device in the present example. A communication control device is an electronic device having a communication function, a display, and a manipulation unit, and is, for example, a smartphone or a PC. In FIG. 1, 1 indicates a communication control device, 2 indicates a control unit, 3 indicates a memory, 4 indicates a storage unit, 5 indicates a manipulation information acquiring unit, 6 indicates a communication unit, 7 indicates a display, and 8 indicates a network.

The control unit 2 implements functions corresponding to various kinds of programs by developing a program stored in the storage unit 4 onto the memory 3 and executing the developed program.

An application such as a browser, a program and setting information for controlling the application, and the like are recorded in the storage unit 4. The manipulation information acquiring unit 5 can acquire manipulation information of the user through a touch panel, a keyboard, or the like. The communication unit 6 establishes a connection with a mobile line or a wireless local area network (WLAN), and performs communication with other communication terminals or servers connected to the network 8. The display 7 displays an application screen or the like of the communication control device 1. The network 8 is a network for communicating with other communication terminals and is, for example, the Internet.

Figure 2:
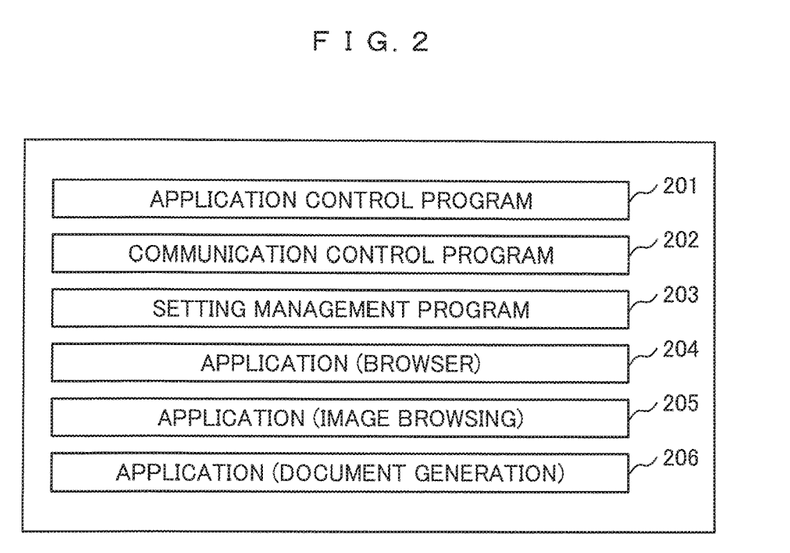
FIG. 2 is a diagram illustrating a specific example of a program which is read from a storage unit in FIG. 1 and developed onto a memory.

FIG. 2 is a diagram illustrating a specific example of a program which is read from the storage unit 4 of the communication control device 1 in FIG. 1 and developed onto the memory 3. In FIG. 2, 201 indicates an application control program, 202 indicates a communication control program, 203 indicates a setting management program, and 204, 205, and 206 indicate applications. 201, 202, and 203 are programs constituting a part of the OS of the communication control device. Incidentally, here, six types of programs are described here, but the number of programs is not limited thereto. Processes performed by the programs mentioned as an example will be described below.

The application control program 201 is a program for managing a switching manipulation of the foreground state and the background state, the activated state, and the like of various applications such as a browser and an image browsing application. The communication control program 202 is a program for imposing a restriction on the communication rate or canceling a restriction in accordance with the state of the application. The setting management program 203 is a program for rewriting setting information necessary for control in the communication control program and acquiring the setting information from a server of a communication company.

The application (browser) 204 is a browser for browsing a web page, the application (image browsing) 205 is an application for browsing images such as photographs, and the application (document generation) 206 is an application for creating a document. The types of applications are examples and not limited to the types described here.

With these programs, in the communication control device 1, it is possible to browse the web page using the browser, browse images captured by a camera, and perform document generation or the like. Further, it is possible to activate these applications at the same time or to switch an application screen.

Figure 3:
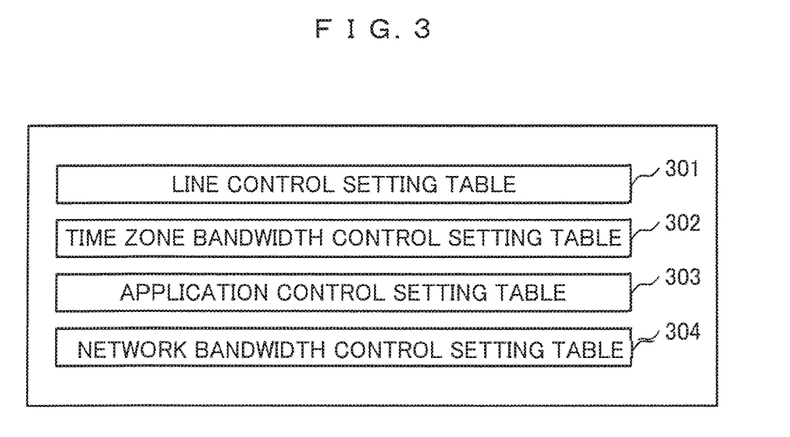
FIG. 3 is a diagram illustrating a specific example of setting information recorded in a storage unit in FIG. 1.

FIG. 3 is a diagram illustrating a specific example of a setting table stored in the storage unit 4 of the communication control device 1 in FIG. 1. In FIG. 3, 301 indicates a line control setting table, 302 indicates a time zone bandwidth control setting table, 303 indicates an application control setting table, 304 indicates a network bandwidth control setting table. Each table is information used for condition determination or the like when the communication control program 202 performs control, and it is possible to write, read, update, or delete content of each table through the setting management program 203.

The line control setting table 301 is setting information for deciding control content in accordance with a line being connected. The time zone bandwidth control setting table 302 is setting information for deciding a network bandwidth to be allocated in accordance with a day or a time zone. The application control setting table 303 is setting information for deciding control content in accordance with an application serving as a control target. The network bandwidth control setting table 304 is setting information for deciding control content in accordance with a network bandwidth of a line being connected.

Figure 4:
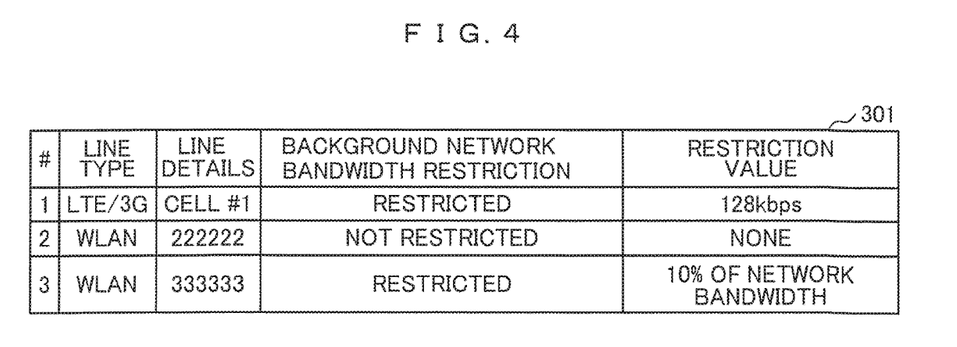
FIG. 4 is a diagram illustrating a specific example of a line control setting table for performing communication control in accordance with a communication line in the first example.

FIG. 4 is a diagram illustrating a specific example of the line control setting table 301 stored in the storage unit of the communication control device 1 in FIG. 1. The communication control device 1 can switch a plurality of communication lines and perform communication. For example, there are a long term evolution (LTE) line, a WLAN line at home, a WLAN line of a mobile router, and the like. The line control setting table 301 is line condition information in which a way of imposing a restriction on the network bandwidth is set for each line. The line condition information may be acquired from a server on the communication line. The line control setting table 301 includes information of items such as a "line type," "line details," "background network bandwidth restriction," and a "restriction value."

The "line type" indicates a type of corresponding line such as LTE, 3G, or WLAN. The "line details" are information for establishing a connection with the line, and for example, the "line details" are an identifier indicating a base station being connected in the case of, for example, LTE or 3G and are a service set identifier (SSID) or an encryption key in the case of, for example, WLAN. The "background network bandwidth restriction" is information of whether or not a restriction is imposed on a network bandwidth of an application in the background state in the line.

The "restriction value" is information indicating a restriction value of a network bandwidth. For example, the restriction value is used as follows. A network bandwidth of the communication control device 1 is virtually divided into a bandwidth in the foreground state and a bandwidth in the background state, and a network bandwidth used as the bandwidth in the background state is set as a value of the restriction value. The restriction value can also be designated using a percentage instead of a method of designating it using a data transfer rate such as 128 kilobits per second (kbps).

The restriction value may be set to 0, but if the background communication is blocked uniformly, the application which has been communicating until then may be determined to have an error. For this reason, it is possible to narrow down the network bandwidth and impose a restriction without completely blocking the communication.

Figure 5:
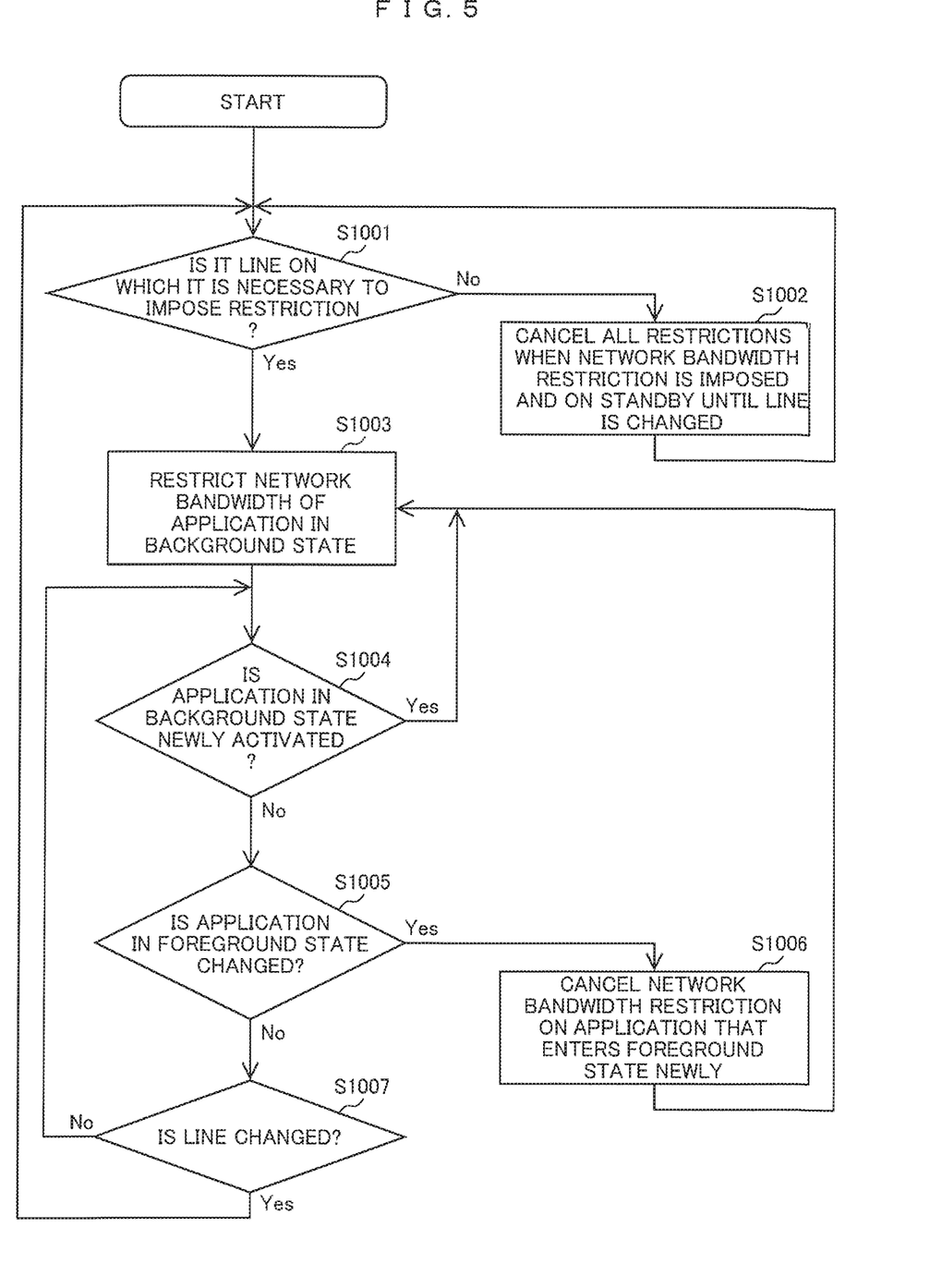
FIG. 5 is a flowchart illustrating a specific example of a series of procedures between programs at the time of communication control in the first example.

FIG. 5 is a flowchart illustrating a specific example of a processing procedure of communication control in the communication control device 1. A process of restricting the network bandwidth of the application in the background state will be described with reference to FIG. 5. Incidentally, each process on a flowchart is performed by the communication control program.

A state after the communication control device is activated and then establishes a connection with a communication line is assumed in FIG. 5. First, the communication control program determines whether or not the communication line being connected thereto is a line on which it is necessary to impose a bandwidth restriction using the line control setting table 301 (S1001). When the determination in S1001 is No, and the communication line being connected thereto is not a line on which it is necessary to impose a bandwidth restriction, it is on standby until the communication line to be connected is changed (S1002). When the process of S1002 is performed in a state in which the restriction is imposed on the network bandwidth already, all restrictions are canceled, and it is on standby until the communication line is changed to another line.

When the determination in S1001 is Yes, and the communication line being connected thereto is a line on which it is necessary to impose a bandwidth restriction, the communication control program restricts the network bandwidth of the application in the background state at the time point (S1003). Information indicating whether or not there is an application being operated in the background state is acquired from the application control program. The restriction value of the network bandwidth is acquired from the line control setting table 301.

As a method of restricting the network bandwidth, various methods can be employed, but it can be realized in the same manner as, for example, a method called time sharing of achieving multitasking using a single central processing unit (CPU). The time sharing is a technique capable of dividing a processing time of the CPU into short times, causing the processing time of the CPU to be shared by the tasks, and executing a plurality of tasks simultaneously. In a case in which the network bandwidth is restricted, the processing time of the communication unit 6 is shared similarly, but an allocation thereto is reduced with respect to an application in the background state.

Then, it is determined whether or not the application in the background state is newly activated (S1004). An application is activated in accordance with a manipulation performed by the user of the communication control device, but there are cases in which an application is automatically activated at a fixed time. For example, there is an application which performs file backup at a fixed time every day. Such an application is often processed in the background state not to affect the use of the screen of the communication control device. In a case in which the application in the background state is activated, a network bandwidth of a newly activated application in the background state is restricted (S1003).

Then, it is checked whether a state of an application in the foreground state is changed (S1005). The change in the state occurs when the user activates an application and the application enters the foreground state, when an application in the foreground state enters the background state, or when an application in the background state enters the foreground state. In a case in which the state of the application in the foreground state is changed, the network bandwidth restriction on the application that enters the foreground state newly is canceled (S1006). Then, the process of S1003 is performed, and the processing content has already been described above, and description thereof is omitted.

Then, it is checked whether or not the communication line is changed (S1007). For example, the change in the communication line occurs when the communication control device switches from an LTE line being connected thereto to a WLAN line.

When the communication line is changed, the process returns to S1001 and it is checked whether or not the changed line is a line on which it is necessary to impose a restriction. When the communication line is not changed, the process returns to S1004. The above process is repeated until the communication control device is powered off.

In the above description, the restriction on the network bandwidth which is the control of the network bandwidth and the cancellation of the restriction are performed at a timing at which the change to the foreground state or the background state is detected. However, in a case in which the change to the foreground state or the background state is frequently repeated in the same application, the restriction on the network bandwidth and the cancellation of the restriction are repeated, and thus such a process increases a load of the communication control device 1, and the communication is likely to be unstable. For this reason, the control of the network bandwidth (the process of S1003 or S1006) may be performed after a certain period of time elapses since the change to the foreground state or the background state is detected. Here, the certain period of time is assumed to be several to several tens of seconds.

Further, the communication of the application may be blocked after a certain period of time elapses since the restriction on the network bandwidth starts. Here, the certain period of time is assumed to be, for example, several to several tens of minutes. The reason for blocking is because there are cases in which the restriction is meaningless in a case in which the communication is continued for a long time although the network bandwidth in the background state is restricted. For example, if a communication rate of a 1 giga-byte file backup process is restricted to 1 mega bps, the entire file can be transferred if communication is continued for about two and half hours. If it is possible to switch to a line with no restriction on a monthly maximum communication volume before two and half hours elapse, it is meaningful to restrict the network bandwidth in the background state, but otherwise, since the communication volume is not changed regardless of whether or not the restriction is imposed, the restriction is meaningless.

In order to avoid such a situation, the communication of the application is blocked after a certain period of time elapses. A count of a lapse of time is reset when the restriction is canceled and starts from a time point at which the restriction is started again. This is because there is a case in which the background state is switched to the foreground state, and then a communication situation is checked.

Incidentally, in the present example, the communication which the user is unconscious of has been described as the communication performed by the application in the background state, but as a modified example, the communication which the user is unconscious of may be limited to an application in the background state which is automatically activated regardless of a manipulation of the user. For example, it is an application or the like activated to acquire news information at a predetermined time. In this case, the application control program holds information of whether or not the application control program is the application in the background state which is automatically activated, and in S1003 of the flowchart of FIG. 5, it is desirable that the communication control program be able to acquire only an application which is automatically activated when the communication control program acquires information indicating the application in the background state from the application control program.

Further, an application which enters the foreground state at least once after the communication line is changed may be excluded from the restriction target by the manipulation of the user. In this case, the application control program holds information of the application which never enters the foreground state at least once, and in S1003, it is desirable to set only the corresponding application as the control target.

As described above, according to the present example, provided is a communication control method used in a communication control device capable of performing communication using an application via a communication line, and includes an application control step of switching a plurality of applications between a foreground state and a background state and a communication control step of changing an allocation amount of a network bandwidth as control for a network bandwidth of a corresponding application in accordance with whether the application switched in the application control step is in the foreground state or the background state.

Further, the communication control step includes restricting the network bandwidth of the application when the application is in the background state.

Accordingly, there is an effect in that it is possible to prevent the communication volume from increasing due to an operation which is not intended by the user, and little restriction is imposed on a communication rate.

Second Example

In the present example, a method of preventing a network bandwidth of a base station from being compressed when a mobile line is used will be described. When a mobile line is used, if a plurality of communication terminals are connected to a single base station or a use bandwidth of each communication terminal being connected is large, a bandwidth of a line provided by the base station is compressed, and a communication rate of each communication terminal decreases.

In this case, when the network bandwidth in the background state is restricted similarly to the first example, the communication volume of the base station is suppressed, and thus the network bandwidth available to each communication terminal is increased, and the user's comfort can be improved.

At this time, the restriction value of the network bandwidth is decided in accordance with a congestion situation of the base station. The restriction value is delivered from a server of a communication company that owns the base station to each communication control device. Alternatively, the communication control device periodically acquires the restriction value from the server.

Here, the network bandwidth is likely to be compressed by communication for delivering or acquiring the restriction value. Further, a congestion situation of a certain base station is considered to tend to be roughly the same depending on a day of the week or a time zone. For example, it is not congested during daytime on weekdays but congested at night. For this reason, if each communication control device holds information in which restriction values corresponding the days of the week or the time zones are set in advance, it is not necessary to deliver or acquire the restriction value in real time.

Figure 6:
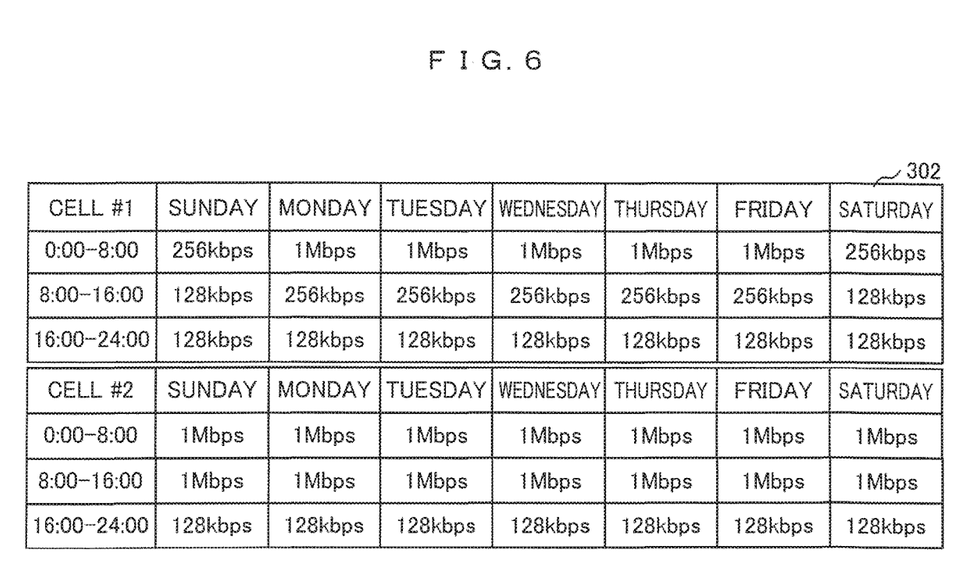
FIG. 6 is a diagram illustrating a specific example of a time zone bandwidth control setting table for performing communication control in a second example in accordance with a date and time.

FIG. 6 is a diagram illustrating a specific example of the time zone bandwidth control setting table 302 stored in the storage unit 4 of the communication control device 1. The time zone bandwidth control setting table 302 is time zone condition information in which the restriction value of the network bandwidth is set for each time zone and describes the restriction value of the network bandwidth for each day of the week and each time zone. Incidentally, in FIG. 6, the restriction value is indicated by a data transfer rate but may be designated by a percentage. The time zone bandwidth control setting table 302 is used instead of the "control value" of the line control setting table 301 in FIG. 4. It is used when the network bandwidth in the background state is restricted in S1003 of the flowchart of FIG. 5 described in the first example.

In the present example, since the time zone bandwidth control setting table 302 is provided, since it has only to be transmitted in advance, it is unnecessary to deliver the restriction value in real time. Therefore, in order to solve the congestion situation of the base station of the mobile line, the network bandwidth is restricted without delivering the restriction value in real time, and thus an available bandwidth of each communication terminal can be improved, and the user's comfort can be improved. In particular, it is more effective for the compression of the bandwidth of the mobile line as the number of terminals performing the communication control among the communication terminals connected to each base station increases.

Third Example

In the present example, a method of preventing the foreground communication from being disturbed by the background communication will be described. Here, a problem lies in that, for example, if there are a plurality of applications in the background states, and the applications greatly use the network bandwidth of the communication control device, the network bandwidth which can be used by the application in the foreground state is narrowed, and the communication rate is likely to be reduced.

Since content of the present example is the same as that of the first example except for the following three differences, description of common parts is omitted.

A first difference among the three differences lies in that, instead of changing the content of the communication control for each line, the content of the communication control is switched in accordance with an available network bandwidth. A second difference lies in that, when the network bandwidth used by the application in the foreground state is left over, the application in the background state can use that amount. A third difference lies in that communication is not blocked even after a certain period of time elapses since the restriction on the communication of the application in the background state is started. The three points will be described in detail below.

A method of switching the content of the communication control which is a first feature will be described below. In the present example, the communication control device decides whether or not the background communication is restricted depending on the size of the network bandwidth which is currently being used. For example, if the network bandwidth is narrow and a plurality of applications performs communication at the same time, the communication rate in the application in the foreground state is extremely reduced, and when the user's comfort is impaired, control is performed such that the network bandwidth in the background state is narrowed, and the network bandwidth in the foreground state is widely allocated. On the contrary, although the network bandwidth is extremely wide and a plurality of applications performs communication at the same time, if there is no influence on the communication rate of the application in the foreground state, the network bandwidth allocation control is not performed.

Figure 7:
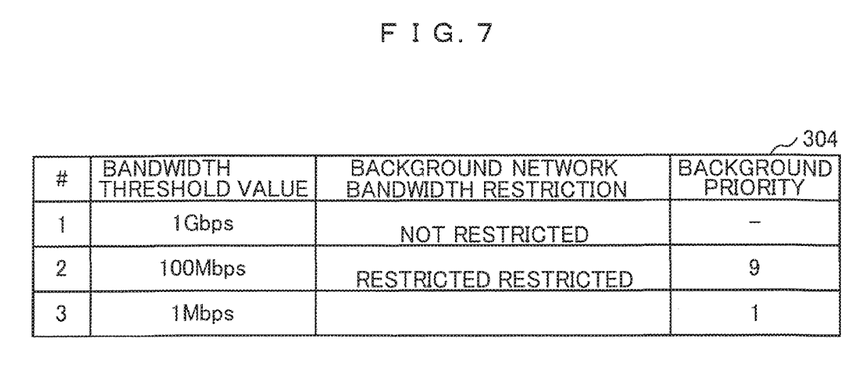
FIG. 7 is a diagram illustrating a specific example of a network bandwidth control setting table for performing communication control for each network bandwidth in a third example.

The determination of whether or not the communication control is performed using the network bandwidth control setting table 304 stored in the storage unit 4 and the value of the network bandwidth of the communication line which is currently being used. FIG. 7 is a diagram illustrating a specific example of the network bandwidth control setting table 304. In FIG. 7, the network bandwidth control setting table 304 is network bandwidth condition information in which it is set whether or not the restriction is imposed on the network bandwidth for each network bandwidth, and includes items such as a "bandwidth threshold value," "background network bandwidth restriction," and "background priority." The network bandwidth condition information may be acquired from a server on the communication line. The "bandwidth threshold value" is information such as, for example, 1 giga bps or 10 mega bps. The "background network bandwidth restriction" is information of whether or not the network bandwidth allocation control of the application in the background state is performed when a bandwidth of a line being used falls below the value of the "bandwidth threshold value. The "background priority" is information designating a priority of the network bandwidth allocated to the application in the background state.

The priority is designated with, for example, 10 levels. Here, the priority of the application in the foreground state is set to the highest value, that is, 10. For example, when the "background priority" is set to 1, and the bandwidth of the communication line being used is 11 mega bps, the application in the foreground state uses 10 mega bps, and the application in the background state uses 1 mega bps.

In a second feature, when the application in the foreground state is not performing communication or when communication with a communication counterpart is slow and does not reach 10 mega bps, a surplus thereof is allocated to the application in the background state. This operation is similar to the function capable of setting a priority of a process in the OS for the PC or the like. As described above, the second feature is realized by the process corresponding to the priority and the usage situation of the network bandwidth in the foreground state.

The reason why the background communication is not blocked after a predetermined period of time elapses which is a third feature is because there is no merit of blocking in the present example since an assumed problem is different. A problem to be solved in the present example is not the increase in the communication volume caused by the background communication but the compression of the network bandwidth in the foreground state caused by the background communication, and thus the communication need not be blocked.

As described above, priorities are given to the foreground state and the background state, and the network bandwidths used in the foreground state and the background state are controlled by respective allocations, and thus communication can be performed such that the foreground communication preferentially secures the communication rate.

Fourth Example

In the present example, a method of making it possible to set whether or not the network bandwidth is restricted for each application will be described. In the above description, the network bandwidth of the application in the background state is uniformly restricted, but in this case, a problem may occur. For example, an application for subscribing to an electronic book performs a process in the background state when downloading a file on a server, but there are cases in which it is desired to download it as soon as possible.

In order to set whether or not the network bandwidth is restricted for each application, a setting table including the information is necessary.

Figure 8:
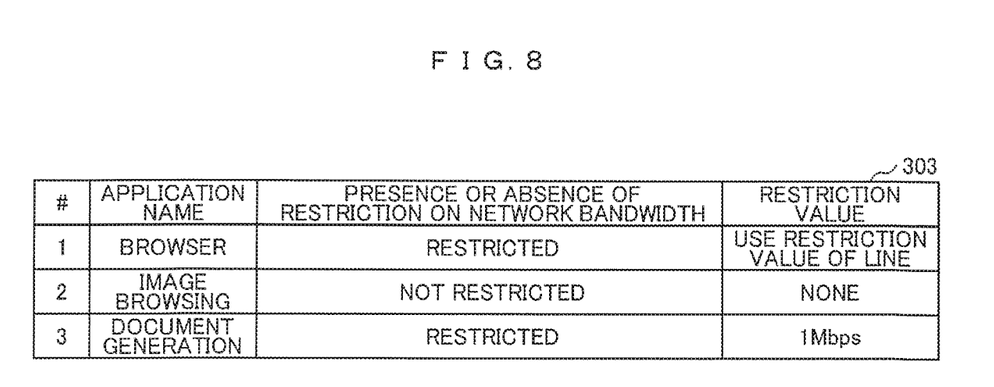
FIG. 8 is a diagram illustrating a specific example of an application control setting table for performing communication control for each application in a fourth example.

FIG. 8 is a diagram illustrating a specific example of the application control setting table 303 stored in the storage unit 4 of the communication control device 1. The application control setting table 303 is application condition information in which it is set whether or not the restriction is imposed on the network bandwidth for each application, and includes information of items such as an "application name," "presence or absence of restriction on network bandwidth," and a "restriction value." The application condition information may be acquired from a server on the communication line.

The "application name" is information used for identifying an application such as, for example, a browser, image browsing, document generation as illustrated in FIG. 8. The "presence or absence of restriction on network bandwidth" is information designating whether or not the network bandwidth of the corresponding application is restricted. The "restriction value" is information indicating the restriction value in a case in which the network bandwidth of the corresponding application is restricted. Incidentally, in FIG. 8, there is a parameter "use restriction value of line," and it means that the "restriction value" of the line control setting table 301 is used.

The application control setting table 303 is referred to when the network bandwidth of the application in the background state is restricted in S1003 of the flowchart of FIG. 5 described in the first example. In S1003, when the application name of the application in the background state is included in the application control setting table 303, the restriction is performed in accordance with the indications of the respective items of the table. The other processes are similar to those of the first example, and thus description thereof is omitted.

Accordingly, it is possible to restrict the network bandwidth for each application.

The present invention is not limited to the above examples and includes various modified examples. For example, the above examples have been described in detail in order to facilitate understanding of the present invention and are not necessarily limited to an example including all the described components. Further, a component of another example may be added to a configuration of a certain example. Further, addition, deletion, or replacement of other components may be performed on a part of each example.

REFERENCE SIGNS LIST

1 Communication control device
2 Control unit
3 Memory
4 Storage unit
5 Manipulation information acquiring unit
6 Communication unit
7 Display
8 Network
201 Application control program
202 Communication control program
203 Setting management program
204 Application (browser)
205 Application (image browsing)
206 Application (document generation)
301 Line control setting table
302 Time zone bandwidth control setting table
303 Application control setting table
304 Network bandwidth control setting table

The invention claimed is:

1. A communication control method used in a communication control device configured to perform communication using an application via a communication line, comprising:
   an application control step of switching a plurality of applications between a foreground state and a background state; and
   a communication control step of performing network bandwidth allocation control by changing an amount of a network bandwidth to be allocated to one application of the plurality of applications in accordance with whether the one application switched in the application control step is in the foreground state or the background state,
   wherein the communication control step includes determining whether the network bandwidth allocation control is executed based on line condition information, wherein the line condition information includes information on a plurality of communication lines through which the plurality of applications performs communication, wherein one of the plurality of communication lines is assigned with information for restricting the network bandwidth, and
   wherein when the one application is in background state and performs communication through the one of the plurality of communication lines, restricting the network bandwidth to be allocated to the one application based on the information for restricting the network bandwidth assigned to the one of the plurality of communication lines.

2. The communication control method according to claim 1, wherein the line condition information is acquired from a server on the communication line.

3. A communication control method used in a communication control device configured to perform communication using an application via a communication line, comprising:
   an application control step of switching a plurality of applications between a foreground state and a background state; and
   a communication control step of performing network bandwidth allocation control by changing an amount of a network bandwidth to be allocated to one application of the plurality of applications in accordance with whether the one application switched in the application control step is in the foreground state or the background state,
   wherein the communication control step includes determining, based on time zone condition information, in which one of time periods the network bandwidth allocation control is performed for the one application, wherein time zone condition information includes a plurality of time periods different from each other, and wherein each of the plurality of periods is assigned with information for restricting the network bandwidth,
   wherein when the one application is in background state, performing the network bandwidth allocation control for the one application based on the information for restricting the network bandwidth assigned to the one of the time periods, and
   wherein the network bandwidth allocation control based on the information is performed during the one of the time periods.

4. The communication control method according to claim 3, wherein the time zone condition information is acquired from a server on the communication line.

5. A communication control method used in a communication control device configured to perform communication using an application via a communication line, comprising:
   an application control step of switching a plurality of applications between a foreground state and a background state; and
   a communication control step of performing network bandwidth allocation control by changing an amount of a network bandwidth to be allocated to one application of the plurality of applications in accordance with whether the one application switched in the application control step is in the foreground state or the background state,
   wherein the communication control step includes determining, based on network bandwidth condition information, which one of bandwidth ranges a currently available bandwidth for the one application belongs to, wherein the network bandwidth condition information includes a plurality of bandwidth ranges different from each other, and wherein each of the plurality of bandwidth ranges is assigned with information for restricting the network bandwidth, and
   wherein when the one application is in background state, performing the network bandwidth allocation control for the one application based on the information for restricting the network bandwidth assigned to the one of the bandwidth ranges.

6. The communication control method according to claim 5, wherein the network bandwidth condition information is acquired from a server on the communication line.

7. A communication control method used in a communication control device configured to perform communication using an application via a communication line, comprising:
- an application control step of switching a plurality of applications between a foreground state and a background state; and
- a communication control step of performing network bandwidth allocation control by changing an amount of a network bandwidth to be allocated to one application of the plurality of applications in accordance with whether the one application switched in the application control step is in the foreground state or the background state,
- wherein, in the communication control step, when the network bandwidth allocation control is performed in accordance with the switching of the application between the foreground state and the background state, the network bandwidth allocation control is executed after a predetermined period of time elapses from a timing of the switching.

\* \* \* \* \*